July 14, 1942. G. M. DYE 2,289,412
APARATUS FOR HOLDING FILMS
Filed Aug. 21, 1939
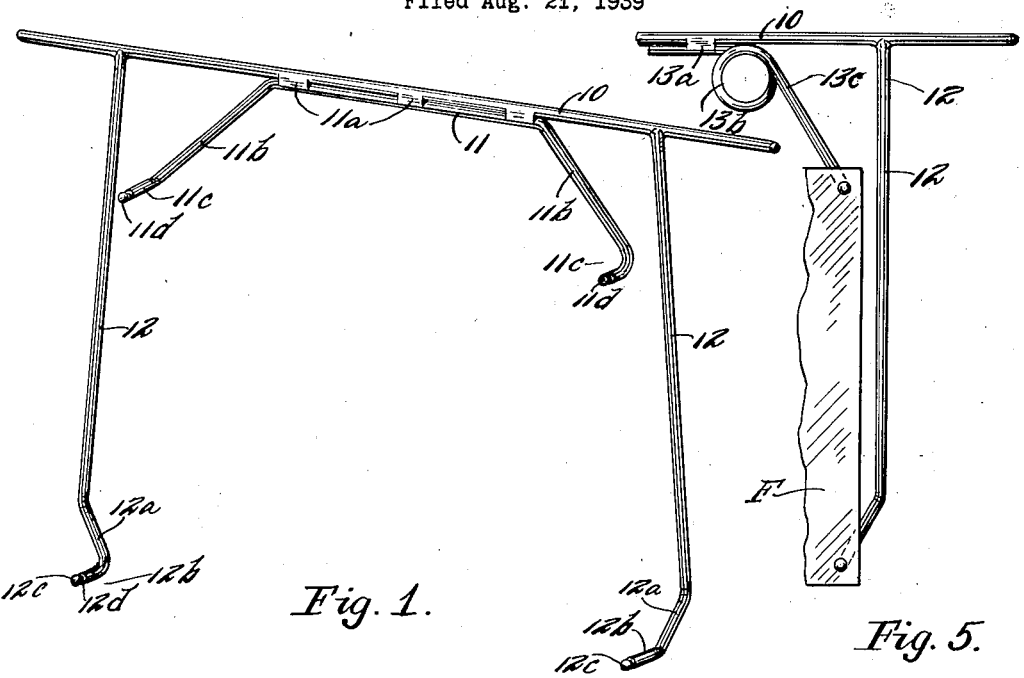
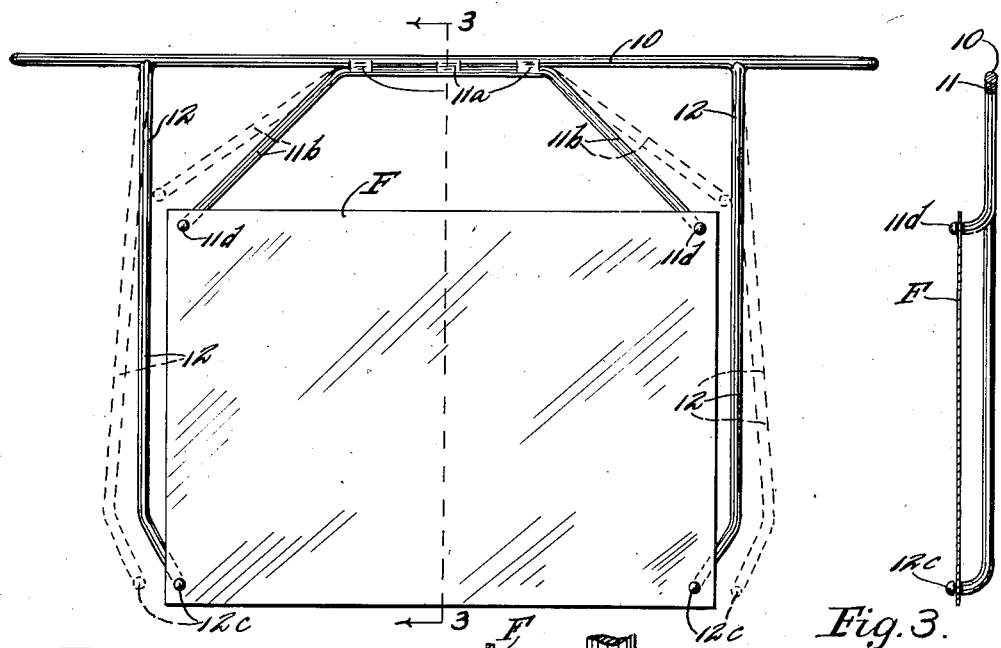
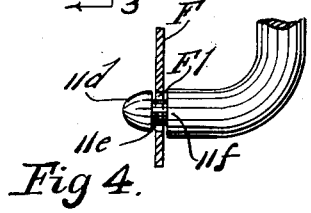
Inventor
GLEN M. DYE
By Chas. C. Reif.
Attorney Patented July 14, 1942

2,289,412

UNITED STATES PATENT OFFICE 2,289,412

APPARATUS FOR HOLDING FILMS

Glen M. Dye, Minneapolis, Minn.

Application August 21, 1939, Serial No. 291,208

2 Claims. (Cl. 95—100)

This invention relates to a method and apparatus for supporting a sheet of flexible material such as a photographic film. It is the common practice to support photographic films for the various operations thereon, such as developing, washing, fixing and drying. Such films are often supported and carried through the different liquids used in the various treating operations. It is the usual, though not invariable practice to support the film in a vertical position or in a vertical plane.

It is desirable to have a film support which will hold the film in a properly distended position to prevent curling or rolling. It is also desirable to have a film holding and supporting means so constructed that it will not gather or hold the liquid on the film so as to mark the same. In many of the film holding devices of the prior art a clip of considerable dimension was used and liquid would collect adjacent this clip and thus not properly drain from the film.

It is an object of this invention, therefore, to provide a device for holding a sheet of flexible material such as a photographic film which engages the film throughout a very small area and is constructed and arranged to permit liquid to completely drain from the film.

It is also an object of the invention to provide a novel method of supporting or holding a sheet of flexible material such as a photographic film.

It is a further object of the invention to provide a device for holding a sheet, such as a photographic film, having spaced means for engaging the film, which means are under tension to move away from each other and which will thus act to distent the film and hold it substantially in one plane.

It is still another object of the invention to provide a device for holding a sheet of flexible material, such as a photographic film, having means constructed and arranged to pass through an opening in said film and thus support the same.

Another object of the invention is that of supporting a film having an opening therethrough comprising a member having a terminal portion of slightly larger diameter than said opening and arranged to be sprung through said opening, said member having another portion adjacent said first mentioned portion of smaller diameter than said opening on which said film is supported.

An additional object of the invention is to provide a film supporting means having members engaging said film at four points, preferably adjacent the corners thereof, which members are under tension tending to move away from the central part of the film so as to hold said film in distended position.

A further object of the invention is to provide a film holder having parts with a minimum area from which liquid may drip, said parts being arranged so as not to drip water onto said film.

These and other objects and advantages of the invention will be fully set forth in the following description made in connection with the accompanying drawing in which like reference characters refer to similar parts throughout the several views and in which:

Fig. 1 is a perspective view of the device;

Fig. 2 is a front view showing a film in said device, the normal position of certain parts being indicated in dotted lines;

Fig. 3 is a vertical section taken on line 3—3 of Fig. 1 as indicated by the arrows;

Fig. 4 is a partial view similar to Fig. 3 shown on an enlarged scale; and

Fig. 5 is a partial view similar to Fig. 2 showing a modification.

Referring to the drawing, a device for holding a sheet of flexible material, such as a photographic film, is shown comprising a rod or bar 10. While bar 10 might be of various shapes, in the embodiment of the invention illustrated it is shown as a cylindrical rod. Another rod 11 is provided which extends in contact with the rod 10 adjacent the central portion thereof and is secured thereto in any suitable manner as by welding. Portions 11a are indicated in Fig. 1 where rod 11 has been spot-welded to rod 10. Rod 11 has portions 11b inclined downwardly from rod 10 and toward the ends thereof, which portions have terminal parts 11c bent substantially at right angles and projecting forwardly in parallel relation. The parts 11c have terminal portions including a rounded or partly rounded end 11d. A portion 11e is formed adjacent and in the rear of portion 11d and of much smaller diameter than portion 11d. The portion 11f in the rear of portion 11e is of slightly greater diameter than the portion 11d. In effect a groove is formed between portions 11d and 11f. Another pair of rods or bars 12 are provided and these are connected at one end to the underside of bar 10 outward of the ends of rod 11. While portions 12 may be connected in any suitable manner they are illustrated as butt-welded to bar 10. Rods 12 diverge somewhat and extend to points well below the terminal portions 11c. Rods 12 have portions 12a bent at an obtuse angle and extending toward each other and portions 12a are provided with terminal parts 12b which extend forwardly and are substantially parallel to portions 11c. Parts 12b have end portions comprising rounded ends 12c similar to portions 11d already described and are also provided with reduced portions 12d similar to the portions 11e already described.

The sheet or film F to be supported is provided with a plurality of openings F1. While these openings might be variously placed, in the embodiment of the invention illustrated they are shown as disposed adjacent the corners of the film F which is shown as of rectangular form or adjacent opposite edges of said film. The openings F1 are of slightly smaller diameter than the diameter of portions 12c and 11d. The said diameters are such that the portions 11d and 12c can be sprung or pushed through openings F1. When said portions are pushed through said openings, however, the film will not readily move over said portions so that it is retained with the opening F1 surrounding the reduced portions 11e or 12d. At its inner side the film will engage the enlarged portion 11f and the similar portion on rods 12 which is of greater diameter than the opening F1 so that the film cannot move inwardly but will engage the shoulder at the end of portion 11f and the similar portion on rods 12. The portions 11b of rod 11 and the rods 12 are resiliently movable and can be sprung inwardly when the film is engaged as shown in Fig. 2. The portions 11b are under tension tending to move away from each other when the film is engaged so that the film is placed under tension and thus held in distended position. The rods 12 are likewise under tension tending to move away from each other when a film is engaged thereby so that the film is also placed under tension and held distended by these rods. The film is thus held substantially in one plane and cannot roll or curl. It will also be noted that the film is engaged over a very small area and there is no part of the holder adjacent the film which will collect liquid. If any liquid should pass onto or drain onto the portions 11c and 12b or their parts it would readily pass downwardly and drain therefrom. All of the liquid can thus drain from the films and there will be no liquid retained to mark or mar the film. The film can readily be removed by again springing the same over the terminal portions 11d and 12c.

In Fig. 5 a modified form of holder is shown. A bar or rod 13 is used which is connected to the underside of bar 10 and this bar or rod is secured to the underside of rod 10 in any suitable manner as by spot-welding as indicated at 13a. Rod 13 may terminate as shown, in which case there would be two of said rods, one adjacent each of the rods 12. Alternately rod 13 could extend along rod 10 and have terminal portions at each end similar to rod 11. Rod 13 is provided with a coil 13b from which a portion 13c extends downwardly and outwardly and is provided with a terminal portion projecting at right angles and which is similar in all respects to terminal portion 11c having parts similar to the parts 11d, 11e and 11f. It will be seen that portion 13c will be resilient and tends to swing toward the outer end of rod 10 or toward the rod 12. The structure shown in Fig. 5 may be preferable for holding larger films and the rod 13 possessing its resiliency due to the coil 13b can be disposed more closely in the corner between rods 10 and 12 than can the portion 11b of rod 11. The operation of the device shown in Fig. 5 will be the same as already described in connection with Figs. 1 to 4. The structure shown in Fig. 5 also gives more flexure on the arm 13c so that the terminal can be moved over considerable distance to accommodate the hole made in the film. It might be that the hole was not just in the correct position. The flexing of arm 13, therefore, gives considerable adjustment to utilize the hole in the film.

From the above description it will be seen that I have provided an extremely simple and efficient film holder. The structure is such that no liquid or solution is retained or imprisoned on the film by the holder. This aids in quick drying and gives a minimum or no blemish on the film. The film is held taut and thus prevented from curling or bowing. The films are thus held nicely in one plane and when a plurality of films are suspended adjacent each other in a tank of liquid they will not come into contact with each other. The films when handled in film treating machines are raised vertically from the various liquids and lowered into the liquids. If the holder is such that considerable liquid is raised thereby the liquid is apt to run off or drip after the film has been raised some distance out of the liquid. The dripping of the liquid from the holder into the tank causes a splash which splatters the film. It will be noted that with the present structure any liquid adhering to the holder will run down the arms 11b, which, by the way, are only partly submerged and this liquid will move onto the parts 11c and drip therefrom. The liquid will either do this almost immediately after part 11c leaves the liquid or the liquid will run onto the film. In either case there will be no dripping back into the tank after the portion 11d has been raised some distance. Liquid adhering to members 12 will also immediately run down the same and onto the parts 12b. This liquid will either drain from parts 12b or contact the film and run off of the film. In either case there will be no dripping of liquid after the parts are some distance above the liquid in the tank. It should also be noted that no liquid can drip from any part of the holder onto the film. This is a very important advantage of the holder. The holder and parts thereof also have a very small area or surface from which water may drip. This is quite an advantage over previous holders. It might be stated that the film holder is usually supported on a member which may be a moving member or conveyor by the portions of bar 10 which project beyond the rods 12. The device has been amply demonstrated in actual practice and found to be very successful and efficient.

It will, of course, be understood that various changes may be made in the form, details, arrangement and proportions of the apparatus and in the steps and sequence of steps of the method without departing from the scope of applicant's invention, which, generally stated, consists in a method and apparatus capable of carrying out the objects above set forth, such as disclosed and defined in the appended claims.

What is claimed is:

1. A film holder for holding a film of substantially rectangular form having in combination, a film supporting rod, a pair of rods secured at the lower side thereof and extending downwardly therefrom in diverging relation, said rods having terminals extending at substantially right angles thereto, a second pair of rods secured to said first mentioned rod and depending substantially vertically therefrom outwardly of said first mentioned rods and substantially in the same plane thereof, said second pair of rods having lower portions extending toward each other at an angle, said lower portions having terminal portions extending substantially at right angles thereto disposed some distance below and substantially vertically alined with said first mentioned terminal portions, said terminal portions being adapted to extend through holes previously made in a film and said four last mentioned rods being resilient whereby said terminal portions will move away from the center of said film and place the same under tension.

2. A film holder for holding a film of substantially rectangular form having in combination, a horizontal film holding bar, rods of small transverse dimension secured to said bar and extending downwardly in diverging relation from the central portion thereof and adapted to be disposed at one side of said film adjacent the upper corners thereof and having portions extending laterally substantially at right angles toward said film and engaging the same to support said film, rods of small transverse dimension secured to said bar outwardly of said first mentioned rods and extending substantially vertically downward adapted to be disposed at the sides of said film, said latter rods having their lower portions converging to be disposed at said side of said film adjacent the lower corners thereof and having portions extending substantially at right angles toward and engaging said film to support it at said lower corners, all of said rods being resilient and capable of being flexed so that they will respectively exert tension on said film away from the center thereof, said rods being so disposed that any liquid adhering thereto will run down the same and off of said portions and onto said film and will drain therefrom.

GLEN M. DYE.